United States Patent Office 2,891,941
Patented June 23, 1959

2,891,941
WATER SOLUBLE TRIAZINE AZO DYESTUFFS

Alfred Fasciati, Bottmingen, and Henri Riat, Arlesheim, Switzerland, assignors to Ciba Limited, Basel, Switzerland, a Swiss firm No Drawing. Application June 27, 1957
Serial No. 668,336
Claims priority, application Switzerland June 29, 1956
10 Claims. (Cl. 260—153)

This invention provides valuable new azo-dyestuffs, which contain at least two strongly acid groups imparting solubility in water and also a monohalogen-triazine radical of the formula (1) 

which is bound to the dyestuff molecule through an amino bridge of the formula

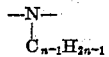

in which $n$ is a positive whole number, and Y represents an etherified hydroxyl group.

Especially valuable among the dyestuffs of the above formula are metal-free dyestuffs of the formula (2)         D—N=N—A in which D represents the radical of a diazo-component which may contain an azo-linkage, and A represents the radical of a coupling component, and in which one of the radicals A and D, which together contain at least two strongly acid groups imparting solubility in water, contains bound thereto through an —NH— group a triazine radical of the formula

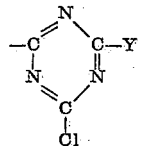

in which Y represents a lower alkoxy group, and benzyloxy group or a phenoxy group which may contain a carboxylic acid or sulfonic acid group.

The aforesaid amino bridge linking the characteristic grouping of the Formula 1 to the dyestuff molecule may be connected directly or through a bridge member, for example, through an alkylene radical or through an —SO₂— group, to the radical of the coupling component or advantageously to the radical D of a diazo-component, which is advantageously at most bicyclic and is of the benzene series. Accordingly, the said radical may be a substituted or unsubstituted phenyl radical or a radical of higher molecular weight, for example, a bicyclic or naphthalene radical which may contain an azo linkage.

The dyestuffs of this invention contain, in addition to a triazine substituent of the Formula 1, at least two strongly acid groups imparting solubility in water, such as carboxylic acid or preferably sulfonic acid groups. Advantageously the dyestuffs contain more than one such group per azo linkage, that is to say, at least two such groups in a monoazo-dyestuff and at least three such groups in a disazo-dyestuff. These groups imparting solubility in water may be distributed in any desired manner in the dyestuff molecule.

The dyestuffs of this invention can be made by replacing in a trihalogen-triazine, especially in cyanuric chloride (2:4:6-trichloro-1:3:5-triazine), two halogen atoms by reacting one with an amino-azo-dyestuff, which contains at least two acid groups imparting solubility in water and an acylatable amino group and the other with an organic hydroxy-compound, for example, benzyl alcohol or cyclohexyl alcohol, or a lower aliphatic alcohol or a phenol.

As amino-azo-dyestuffs, which contain at least two groups imparting solubility in water and an acylatable amino group, there may be used those which contain the acylatable amino group in the radical of the coupling component and/or advantageously in the radical of the diazo-component.

For making dyestuffs which contain the acylatable amino group in the radical of the coupling component, there may be used for example, coupling components of the benzene or naphthalene series, which owe their capacity for coupling to the presence of an at most secondary amino group or an aromatically bound hydroxyl group, or keto-methylene compounds which contain, in addition to a methylene group capable of coupling in a position vicinal to an enolizable keto group, an advantageously aromatically bound acylatable amino group. As such coupling components there may be mentioned, for example, ω-methane-sulfonic acid derivatives of aniline, of ortho-methoxy-aniline and of ortho-carboxy-aminobenzene (the ω-methane sulfonic acid group being split off hydrolytically after reduction of the dyestuff to liberate the amino group), and also meta-toluidine, 3 - acetylamino - 1 aminobenzene, 3-ureido - 1 - aminobenzene, 1 - aminobenzene - 2 methyl - 5 - methoxybenzene, 1-amino-2:5-dimethoxy- or -diethoxy-benzene, 1 - amino- 3 - methoxybenzene, 1 - amino - 2 - methoxybenzene-5-isopropylbenzene, α- or β-naphthylamine and above all naphthylamine monosulfonic acids, such as 1-aminonaphthalene-6- or -7-sulfonic acid, 2-amino-naphthalene-6-sulfonic acid, 2-amino-8-hydroxynaphthalene-6-sulfonic acid, 2-N-methylamino-8-hydroxynaphthalene-6-sulfonic acid, 2-alkylamino- or 2-arylamino-5-hydroxy-naphthalene-7-sulfonic acid, 2-amino-5-hydroxynaphthalene-7-sulfonic acid, 2-(4'-aminobenzoyl-amino)-5-hydroxynaphthalene-7-sulfonic acid, 2-(4'-aminophenyl-amino)-5-hydroxnaphthalene-7-sulfonic acid, and also β-keto-carboxylic acid derivatives, especially acetoacetic acid arylides, and above all pyrazolones, such as 1-benzoylacetamino-3- or -4-(4'-aminobenzoyl)-aminobenzene, 1 - acetoacetylamino - 4 - aminobenzene - 3 - carboxylic acid, 1-acetoacetylamino-3-aminobenzene-4-sulfonic acid, 1 - acetoacetylamino - 4 - aminobenzene - 3 - sulfonic acid, 1-acetacetylamino-4-aminobenzene, and also acetoacetyl-diaminobenzenes, which may be substituted in the benzene nucleus by an alkyl or alkoxy group or a halogen atom, 1-acetoacetylamino-4'-aminodiphenylmono- or disulfonic acid, 1-acetacetylamino-4'-aminostilbene-2:2'-disulfonic acid and monoacetoacetyl compounds of 1:4-diaminodiphenyl-urea or of diamino-azobenzene sulfonic acids, and also 5-pyrazolones such as 1-(3'- or 4'-amino)-phenyl-3-methyl-5-pyrazolone and the corresponding sulfonic acids, 1-[4'-(4''-aminophenyl)-phenyl]-3-methyl-5-pyrazolone and the corresponding sulfonic acids, 1-[4'-(4'' - aminophenyl) - phenyl] - 3 - methyl - 5 - pyrazolone and 1-[4-(4''-aminophenyl)-phenyl]-5-pyrazolone-3-carboxylic acid and the corresponding sulfonic acids, and also the compound of the formula

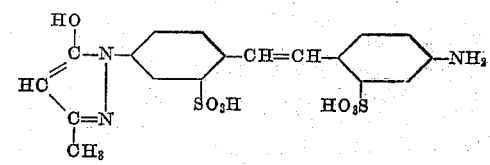

or

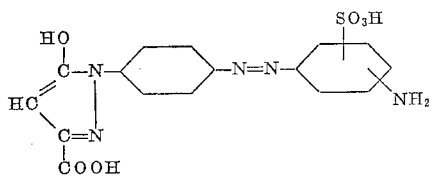

and finally compounds obtainable by the nitrobenzoylation and reduction of these 1-aminoaryl-5-pyrazolones, which compounds contain an amino group capable of condensing and which are capable of coupling in the 4-position of the pyrazolone nucleus.

The diazo-components to be coupled with these coupling components may contain substituents not imparting solubility in water, and if desired, azo linkages, and they must contain strongly acid substituents capable of imparting solubility in water, such as sulfonic acid groups, if the coupling components used as starting materials contain only one or contain no such groups. These diazo-components may be relatively simple compounds, for example, aminobenzene sulfonic acids, aminonaphthalene sulfonic acids, amino-pyrene sulfonic acids or aminochrysene sulfonic acids or aminonaphthol sulfonic acids or aminophenol sulfonic acids, or they may be more complex diazotizable compounds, which contain for example, one or two azo linkages.

As examples of amines, whose diazo-compounds are coupled with the coupling components containing the afore said acylatable amino groups, there may be mentioned the following aminosulfonic acids:

(A)

1-aminobenzene-2-, -3- or -4-sulfonic acid,
2-amino-1-methoxybenzene-4-sulfonic acid,
3-amino-2-hydroxybenzoic acid-5-sulfonic acid,
3-amino-6-hydroxybenzoic acid-5-sulfonic acid,
2-aminophenol-4-sulfonic acid,
5-acetylamino-2-aminobenzene-1-sulfonic acid
5-acetylamino- or 5-benzoylamino-2-aminobenzene-1-carboxylic acid,
2-aminobenzoic acid-4- or -5-sulfonic acid,
1-aminonaphthalene-4-, -5-, -6- or -7-sulfonic acid,
2-aminonaphthalene-4-, -6-, -7- or -8-sulfonic acid,
1-aminonaphthalene-3:6-disulfonic acid,
1-aminobenzene-2:5-disulfonic acid,
2-aminonaphthalene-4:8- or -6:8-disulfonic acid,
1-(3'- or 4'-aminobenzoyl) - aminobenzene - 3 - sulfonic acid,
3-aminopyrene-8- or -10-monosulfonic acid,
3-aminopyrene-5:8- or -5:10-disulfonic acid, or
4-nitro-4'-aminostilbene-2:2'-disulfonic acid, and the O-acyl-derivatives of
1-amino-8-hydroxynaphthalene-3:6- or -4:6-disulfonic acid,
2-amino-8-hydroxynaphthalene-6-sulfonic acid,
2-amino-5-hydroxynaphthalene-7-sulfonic acid, or
2 - (4'-aminobenzoylamino)-5-hydroxynaphthalene-7-sulfonic acid.

Dehydrothiotoluidine mono- or di-sulfonic acid, etc. There may also be used as diazo-components amino-azo-dyestuffs such as those obtainable by coupling one of the above-mentioned coupling components containing —NH$_2$ groups, with the diazo-compounds of the above-mentioned amino-sulfonic acids.

For producing starting materials which contain the acylatable amino group in the diazo-component, there may be used, for example, diazo-compounds of mono-acyl-derivatives of aromatic diamines, for example, mono-acyl-derivatives of 4:4'-diamino-diphenyl-3-sulfonic acid, 4:4'-diaminostilbene-2:2'-disulfonic acid, 4-(4'-aminobenzoylamino)-1-aminobenzene-2-sulfonic acid, 1:3- or 1:4-diaminobenzene, 1:4-diaminobenzene - 2 - carboxylic acid, 1:3-diaminobenzene-4-sulfonic acid or 1:4-diamino- benzene-3-sulfonic acid, 2-methoxy-1:4-diaminobenzene-5-sulfonic acid, the acyl radicals of which are saponified after coupling to liberate the amino group. As coupling components there may be used in this case compounds capable of coupling which are free from acylatable amino groups, for example, (B)

β-Keto-carboxylic acid esters or amides which are capable of coupling in the α-position, for example, acetoacetic acid arylides, pyrazolones, especially 5-pyrazolones capable of coupling in the 4-position, such as 3-methyl-5-pyrazolone, 1-phenyl-3-methyl-5-pyrazolone, 1-phenyl-3-methyl-5-pyrazolone-2'- or -3'- or -4'-sulfonic acid, 1-phenyl-5-pyrazolone-3-carboxylic acid, 5-pyrazolone-3-carboxylic acid amide, barbituric acids, hydroxyquinolines or phenols, such as 8-hydroxyquinoline, 2:4-dihydroxyquinoline, paracresol, 2-carboxy-1-hydroxybenzene, naphthols such as α- or β-naphthols, α- or β-naphthylamine, 2-hydroxynaphthalene-sulfonic acid amides, and especially amino- and/or hydroxy-naphthalene sulfonic acids or their N-alkyl-, N-aryl- or N-acyl- derivatives, such as 1-hydroxynaphthalene-3- or -4- or -5- or -8-sulfonic acid, 2-hydroxynaphthalene-4- or -5- or -6- or -7- or -8-sulfonic acid, 1:8-dihydroxynaphthalene-3:6-disulfonic acid, 2-hydroxynaphthalene-3:6- or -6:8-disulfonic acid, 1-hydroxynaphthalene-3:6- or 3:8-disulfonic acid, 2-aminonaphthalene-6-sulfonic acid, 1-amino-8-hydroxynaphthalene-2:4- or -3:6- or 4:6-disulfonic acid and the N-acyl-derivatives of aminonaphthol sulfonic acids, which contain as the acyl radical, for example, an acetyl, propionyl, butyryl, chloracetyl, β-chloropropionyl, benzoyl, ortho-, meta- or para-chlorobenzoyl, nitrobenzoyl, tertiary butyl-benzoyl, 3'- or 4'-aminobenzoyl, methane- or ethane-sulfonyl, para-toluene-sulfonyl or chlorobenzene sulfonyl group, or a carbomethoxy or carbethoxy group, or an acyl radical derived from a cyanuric acid, for example, a radical of the formula

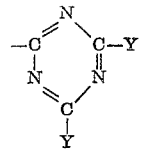

in which the two substituents Y represent halogen atoms or amino groups, and especially substituted amino groups.

There may also be used as coupling components 5:5'-dihydroxy-2'-dinaphthyl-urea-7:7'-sulfonic acid and 5:5'-dihydroxy - 2:2' - dinaphthylamine - 7:7'-disulfonic acid, which like 1-amino-2-hydroxynaphthalene-3:6-disulfonic acid can be coupled twice with the aforesaid diazo-components, and also compounds capable of coupling which contain azo-linkages, for example, monoazo-compounds, which can be made, for example, by coupling in an acid medium a simple diazo-compound of the benzene or naphthalene series (for example, a diazotized naphthylamine, an aniline such as chloraniline or nitroaniline, a toluidine, a 2-aminobenzoic acid, a 5-nitro-2-aminobenzoic acid or a nitro-aminophenol, or a chloroaminophenol etc.) with 2-amino-5-hydroxynaphthalene-7-sulfonic acid or with 1-hydroxy-8-aminonaphthalene-3:6-disulfonic acid.

In this case also only those starting materials should be coupled together, which lead to the formation of amino-azo-dyestuffs containing at least two groups imparting solubility in water.

The condensation of the amino-azo-dyestuffs obtained from these components with cyanuric chloride is carried out in such manner that two exchangeable halogen atoms remain in the condensation product obtained, and of which halogen atoms one is exchanged for the radical of an organic hydroxy-compound. As such hydroxy-compounds there may be used aliphatic or aromatic hydroxy-compounds, such as methyl alcohol, ethyl alcohol, isopropyl alcohol, butyl alcohol, cyclohexanol, methoxyethyl alcohol, or phenols free from sulfonic acid groups, such as phenol, ortho-, meta- or para-cresol, 4-secondary butylphenol, 4-tertiary amyl-phenol, dialkyl phenols, chlorophenols or especially 1-hydroxybenzene-2- or -3- or -4-sulfonic acid or salicylic acid, and also heterocyclic or araliphatic alcohols, such as furyl alcohol or benzyl alcohol. Good results are generally obtained with the corresponding alkali metal alcoholates or phenolates.

The condensation of these alcohols or phenols or their alkali metal compounds with the dihalogentriazine dyestuffs in the process of this invention is advantageously carried out in the presence of an acid-binding agent, such as sodium acetate or sodium carbonate and under conditions such that an exchangeable halogen atom remains in the product, that is to say, for example, in an organic solvent or at a relatively low temperature in an aqueous medium.

Instead of condensing the cyanuric chloride first with the amino-azo-dyestuff and then with the alcohol, the procedure may be reversed by first condensing an alcohol or a phenol with cyanuric chloride to form a dihalogentriazine of the formula (3)

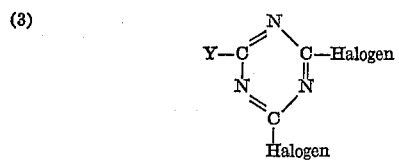

in which Y has the meaning given in connection with Formula 1, and subsequently condensing the primary condensation product of the Formula 3 with the amino-azo-dyestuff, which contains at least two strongly acid groups imparting solubility in water and also an acylatable amino group, for example, with an amino-azo-dyestuff obtainable from the components mentioned above.

The dyestuffs of this invention can also be made by a modification of the above process. In this modification of the process the aforesaid monohalogentriazine radical is not incorporated into the finished dyestuffs or into the components used for making them. Thus, a dihalogentriazine of the Formula 3 may be condensed with a coupling component or diazo component suitable for making the dyestuff by coupling and containing, in addition to the group capable of leading to dyestuff formation, an acylatable amino group.

As examples of coupling and diazo-components obtainable as described above, which contain a radical of the Formula 1, there may be mentioned (a) As diazo-components the secondary condensation products of 1 mol of cyanuric chloride with 1 mol of methyl alcohol, isopropyl alcohol, methoxyethyl alcohol or an hydroxybenzene sulfonic acid and 1 mol of 4:4'-diaminodiphenyl-3-sulfonic acid, 4:4'-diaminostilbene-2:2'-disulfonic acid, 4-(4'-aminobenzoyl-amino)-1-aminobenzene-2-sulfonic acid, 1:3- or 1:4-diamino-benzene-1:4-diaminobenzene-2-carboxylic acid, 1:3-diaminobenzene-4-sulfonic acid or 1:4-diaminobenzene-3-sulfonic acid, 2-methoxy-1:4-diaminobenzene-5-sulfonic acid and the secondary condensation products of the formulae

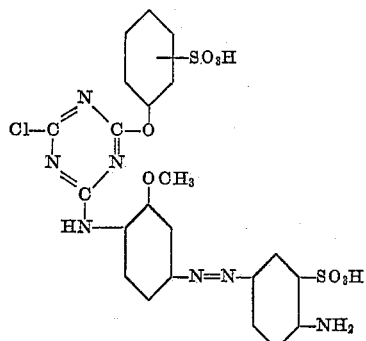

and

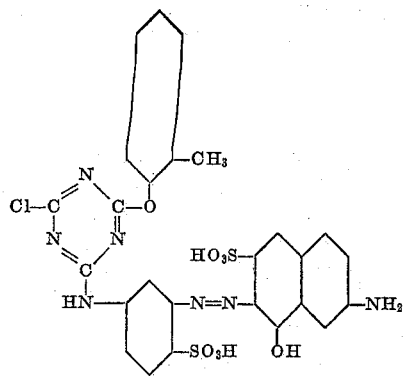

(b) As coupling components the secondary condensation products of 1 mol of cyanuric chloride, 1 mol of methyl alcohol, phenol or hydroxybenzene sulfonic acid and 1 mol of 2-amino-8-hydroxy-naphthalene-6-sulfonic acid, 2-amino-5-hydroxynaphthalene-7-sulfonic acid or 2-(4'-aminobenzoylamino)-5-hydroxynaphthalene-7-sulfonic acid, 1-acetoacetylamino-4-aminobenzene-3-carboxylic acid or -3-sulfonic acid, 1-acetoacetylamino-4'-aminostilbene-2:2'-disulfonic acid, 1-(3'- or 4'-aminophenyl)-5-pyrazolone-3-carboxylic acid or 1 mol of the compound of the formula

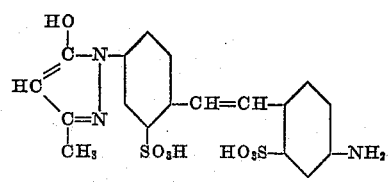

or

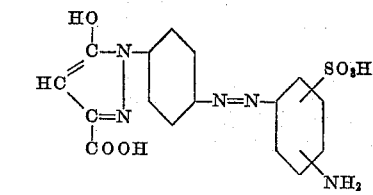

In making the dyestuffs of the invention by condensing one of the aforesaid amino-azo-dyestuffs with cyanuric chloride and one of the aforesaid hydroxy-compounds in general the condensation may be carried out in either order of succession, and the condensations necessary for making the secondary condensation products to be used as dyestuff components are advantageously carried out by first making the dihalogen-triazine of the Formula 3 and subsequently condensing the latter with the dyestuff component necessary for the coupling.

Thec ondensations are advataneogusly carried out in the presence of an acid-binding agent, such as sodium acetate or sodium carbonate, in such manner that the resulting dyestuff condensation product contains one of the three exchangeable halogen atoms of cyanuric chloride, for example, by working in a weakly acid or weakly alkaline to neutral medium and/or by maintaining the temperature as low as possible.

Without losing their valuable properties the dyestuffs of this invention can be isolated and worked up into useful dry dyestuff preparations. The dyestuffs are isolated preferably at as low a temperature as possible by salting out and filtration. After being filtered off the dyestuffs may be dried, if desired, after the addition of extenders or buffers, for example, a mixture of equal parts of a monoalkali phosphate and a dialkali phosphate. The drying is preferably carried out at not too high a temperature and under reduced pressure. In certain cases it is possible by spray drying the whole mixture resulting from the dyestuff manufacture to produce dry preparations directly, that is to say, without intermediate isolation of the dyestuff.

The new dyestuffs of this invention are suitable for pecially cellulosic materials having a fibrous structure, such as linen, cellulose, regenerated cellulose and above all cotton. They are especially suitable for dyeing by the so-called padding dyeing process, in which the goods are impregnated with an aqueous dyestuff solution which may contain a high concentration of salt, and the dyestuff is fixed by treatment with alkali, advantageously at a raised temperature.

When the dyestuffs contain groups capable of forming complexes, for example, an ortho:ortho'-dihydroxy-azo-grouping or an ortho-hydroxy-carboxy-grouping such as is present in salicylic acid esters, the dyeings produced with such dyestuffs may be treated with an agent yielding metal, for example, an agent yielding chromium, but preferably one yielding copper. The treatment with the agent yielding metal may be carried out in the usual manner. In many cases very valuable dyeings are obtained by using the process in which a dyeing produced with the metal-free dyestuff is after-treated with an aqueous solution which contains a water-soluble, preferably complex, copper compound and a basic condensation product of formaldehyde with a compound which contains at least once the atomic grouping

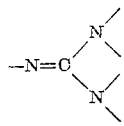

or a compound, such as cyanamide, that is easily convertible into a compound containing the said grouping.

Dyeings produced with the new dyestuff preparations on cellulosic fibers are generally distinguished by the purity of their tints, by their good fastness to light and above all by their excellent fastness to washing.

The following examples illustrate the invention, the parts and percentages being by weight unless otherwise stated, and the relationship of parts by weight to parts by volume being the same as that of the kilogram to the liter.

Example 1

18.4 parts of cyanuric chloride are dissolved in 400 parts by volume of methanol at 20–25° C. and the solution is cooled to 0° C. Then 2 parts of water are added and 9.3 parts of finely powdered sodium carbonate are strewn in.

The whole is stirred for 2 hours at 0–5° C., the temperature is allowed to rise to 20–25° C., and the whole is further stirred for 2 hours at that temperature. It is then cooled to 5° C. and a solution of 18.8 parts of 1:3-diaminobenzene-4-sulfonic acid (in the form of its sodium salt) in 700 parts by volume of water is added. A further 200 parts by volume of a 4 N-solution of sodium acetate is added and the whole is stirred for 3 hours at 30–35° C. The dissolved reaction product is precipitated by the addition of hydrochloric acid and 15% by volume of sodium chloride, and filtered off.

31.5 parts of the condensation product so obtained are stirred in 300 parts of water, 300 parts of ice and 20 parts of hydrochloric acid of 30 percent strength, and diazotization is carried out at 0–2° C. with 25 parts by volume of a 4 N-solution of sodium nitrite. To the diazo-suspension so obtained, which is still acid to Congo, are added 15 parts of sodium bicarbonate, and then the mixture is added to a solution, cooled to 0–2° C., of 42.3 parts of 1-benzoylamino-8-hydroxynaphthalene-3:6-disulfonic acid (as the alkali salt) in 400 parts of water and 15 parts of calcined sodium carbonate. When the coupling is finished, the dyestuff is precipitated by the addition of potassium chloride, filtered off, washed with potassium chloride solution, and dried at 70° C. in vacuo. It dissolves in cold water with a bluish red coloration, and dyes cellulose fibers fast bluish red tints by the padding dyeing process.

There are also obtained by this method by coupling the secondary condensation products given in column I of the following table with the coupling components given in column II similar dyestuffs, which dye cotton by the padding dyeing process the wet fast tints given in column III.

| | I | II | III |
|---|---|---|---|
| 1 | H₃CO—C(=N)—N=C(Cl)—N=C—NH—C₆H₄(SO₃H)(NH₂) | HO, NH—COCH₃ naphthalene with HO₃S— and —SO₃H | bluish red. |
| 2 | H₃CO—C(=N)—N=C(Cl)—N=C—NH—C₆H₄(SO₃H)(NH₂) | HO, Cl; HC(=C(OH))—C(CH₃)=N—N—C₆H₄(SO₃H)(Cl) | greenish yellow. |
| 3 | H₃CO—C(=N)—N=C(Cl)—N=C—NH—C₆H₄(SO₃H)(NH₂) | HC(=C(OH))—C(CH₃)=N—N—C₆H₄(SO₃H) | Do. |
| 4 | H₃CO—C(=N)—N=C(Cl)—N=C—NH—C₆H₄(SO₃H)(NH₂) | HO, NH—COCH₃ naphthalene with HO₃S— and —SO₃H | red. |

| | I | II | III |
|---|---|---|---|
| 5 | (structure) | (structure) | bluish red. |
| 6 | (structure) | (structure) | greenish yellow. |
| 7 | (structure) | (structure) | Do. |
| 8 | (structure) | (structure) | golden yellow. |
| 9 | (structure) | (structure) | greenish yellow. |
| 10 | (structure) | (structure) | blue-red. |
| 11 | (structure) | (structure) | Do. |
| 12 | (structure) | (structure) | orange. |
| 13 | (structure) | (structure) | greenish yellow. |

Example 2

30.3 parts of 2-aminonaphthalene-4:8-disulfonic acid are diazotized in the presence of hydrochloric acid with 6.9 parts of sodium nitrite. The diazo-compound is coupled in acetic acid solution with 15 parts of 1-amino-3-acetyl-aminobenzene. The monoazo-dyestuff so formed is salted out, filtered off, and dissolved in 2000 parts of water. The solution, after being neutralized with sodium carbonate, is run into an ice-cold suspension of 18.4 parts of cyanuric chloride, and the whole is stirred for 30 minutes at 0 to 5° C. Then about 50 parts by volume of a 2 N-solution of sodium carbonate are added dropwise so that the reaction mixture is maintained at a slightly acid reaction (pH value of 5.5 to 6). When free amino groups can no longer be detected, an aqueous solution of 9.4 parts of phenol and sufficient sodium carbonate to produce a pH value of 8.5 to 9 are added, and the whole is stirred for a few hours at room temperature, the reaction mixture being maintained weakly alkaline by the addition of further sodium carbonate. The dyestuff so formed is then salted out, filtered off, and dried in vacuo at a moderately raised temperature. It dyes cotton from baths having a high salt concentration and in the presence of alkali, or by the padding dyeing process, yellow tints that are very fast to light and washing.

Similar dyestuffs are obtained by using 10.8 parts of ortho- or para-cresol, instead of 9.4 parts of phenol.

Example 3

24.1 parts of 2-phenoxy-4:6-dichloro-1:3:5-triazine are suspended in 1000 parts of water, and a neutralized solution of 18.4 parts of 1:4-diaminobenzene-2-sulfonic acid is added. About 50 parts by volume of a 2 N-solution of sodium carbonate are gradually added, and the whole is stirred for a few hours at 30–40° C. The secondary condensation product so obtained is separated by the addition of hydrochloric acid and sodium chloride.

The product so obtained is diazotized in the usual manner with sodium nitrite in hydrochloric acid solution and the diazo-compound is coupled in acetic acid solution with 29.3 parts of 2-amino-8-hydroxy-naphthalene-6-sulfonic acid. The dyestuff so obtained dyes cotton fast bluish red tints.

Similar dyestuffs are obtained by using 2-methoxy-4:6-dichloro-1:3:5-triazine and 1:3-diaminobenzene-4-sulfonic acid instead of the indicated 2-phenoxy-2:4-dichloro-1:3:5-triazine and of the 1:4-diaminobenzene-2-sulfonic acid mentioned in this example.

Example 4

62.7 parts of the dyestuff of the formula

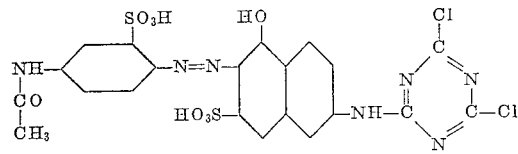

are suspended in 2000 parts of water and an aqueous solution of 9.4 parts of phenol is added. Such a quantity of an aqueous solution of sodium carbonate is then added dropwise in the course of 4 hours that the pH value of the reaction mixture is maintained between 8 and 9. The dyestuff so formed is then salted out and filtered off. It dyes cotton by the padding dyeing process fast scarlet red tints.

A very easily soluble dyestuff having otherwise similar properties is obtained by using for forming the dyestuff 19.8 parts of sodium 3-hydroxybenzene-1-sulfonate, instead of 9.4 parts of phenol.

Example 5

60.7 parts of the amino-azo-dyestuff (obtained by coupling diazotized 4-amino-1:1'-azobenzene-3:4'-disulfonic acid with 2-acetylamino-5-hydroxynaphthalene-7-sulfonic acid in the presence of sodium carbonate followed by splitting off of the acetyl group by means of a warm dilute solution of sodium hydroxide) are dissolved in 2000 parts of water. The resulting solution is run into an ice-cold suspension of 18.4 parts of cyanuric chloride. The whole is stirred for one hour at 0–5° C., and then a solution of 10% strength of sodium carbonate is added dropwise until the reaction is neutral. When free amino groups can no longer be detected 9.4 parts of phenol and such a quantity of sodium carbonate are added that the mixture is maintained at a pH value of 8 to 8.5. After stirring the mixture for 4 to 6 hours at 40° C. the dyestuff formed is salted out, filtered off, and dried in vacuo. It dissolves in water with a red coloration, and dyes cotton by the padding dyeing process in the presence of alkali very pure red tints.

Example 6

2 parts of the dyestuff obtained as described in the first and second paragraphs of Example 1 are dissolved in 100 parts of water by boiling. A cotton fabric is impregnated at 80° C. with the solution, and squeezed to remove the excess of solution until the increase in the weight of the fabric is 70 percent. The fabric is dried, and then passed through a solution of 10 parts of sodium hydroxide and 300 parts of sodium chloride in 1000 parts of cold water, squeezed until its increase in weight is 70%, steamed for 60 seconds, rinsed, neutralized in a solution of 0.5 percent strength of bicarbonate, rinsed, soaped for 15 minutes in a boiling solution of 0.3 percent strength of an ion-free detergent, rinsed and dried. There is obtained a red dyeing which is fast to washing and light.

Similar results are obtained by using 20 or 30 parts of sodium carbonate, instead of 10 parts of sodium hydroxide, and steaming for 3 minutes instead of 60 seconds.

Example 7

2 parts of the dyestuff obtained as described in the first and second paragraphs of Example 1 are dissolved in 100 parts of water by the addition of 1 part of sodium hydroxide. A cotton fabric is impregnated with the solution at room temperature, then squeezed until its increase in weight is 70%, and dried. The fabric is then steamed for 160 seconds, rinsed, and finished in the manner described in Example 6. There is obtained a red dyeing that is fast to washing and light.

Example 8

2 parts of the dyestuff obtained as described in the first paragraph of Example 4 are dissolved in 4000 parts of water. To the solution are added 40 parts of trisodium phosphate and 80 parts of sodium chloride, and 100 parts of a well wetted cotton fabric are entered into the dyebath. In 45 minutes the temperature is raised to 90° C., a further 80 parts of sodium chloride being added to the dyebath after 30 minutes. The temperature is maintained at 90° C. for 30 minutes, and the dyeing so produced is rinsed and soaped for 15 minutes in a boiling solution of 0.3% strength of an ion-free detergent, rinsed again, and dried. There is obtained a scarlet red dyeing that is fast to washing.

What is claimed is:

1. A water soluble azodyestuff which contains at least two sulfonic acid groups imparting solubility in water and corresponds in its free acid state to the formula

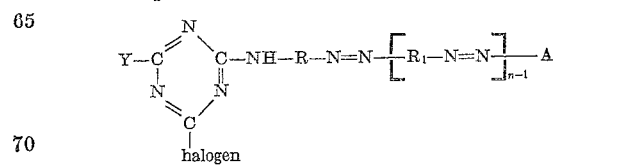

wherein halogen represents a member selected from the group consisting of chlorine and bromine, $n$ is a positive whole number up to 2, R represents a benzene radical, $R_1$ is a member selected from the group consisting of benzene and naphthalene radicals, A represents the radical of a coupling component containing a sulfonic acid group, and Y represents a member selected from the group consisting of the lower alkoxy and phenoxy groups.

2. A water soluble monoazodyestuff which contains at least two sulfonic acid groups imparting solubility in water and corresponds in its free acid state to the formula

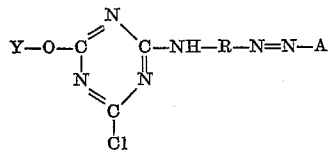

in which Y represents a member selected from the group consisting of lower alkyl and phenyl groups, A represents the radical of a coupling component which contains a sulfonic acid group and R represents a radical of the benzene series containing a sulfonic acid group.

3. A monoazo dyestuff which contains at least two sulfonic acid groups imparting solubility in water and corresponds in its free acid state to the formula

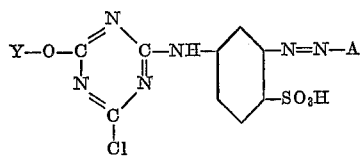

wherein Y represents a lower alkyl group and A represents a member selected from the group consisting of aminonaphthol sulfonic acid radicals and 5-pyrazolone radicals containing a sulfonic acid group and bound to the azo linkage in 4-position.

4. A monoazo dyestuff which contains at least two sulfonic acid groups imparting solubility in water and corresponds in its free acid state to the formula

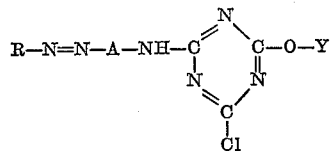

wherein R represents the radical of benzene-sulfonic acid, A the radical of a hydroxynaphthalene sulfonic acid and Y represents a lower alkyl group.

5. A monoazo dyestuff which contains at least two sulfonic acid groups imparting solubility in water and corresponds in its free acid state to the formula

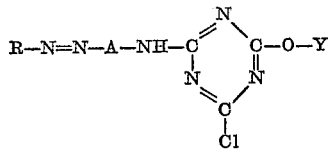

wherein R represents the radical of naphthalene-sulfonic acid, A the radical of a hydroxynaphthalene sulfonic acid and Y represents a lower alkyl group.

6. The monoazo dyestuff which in its free acid state corresponds to the formula

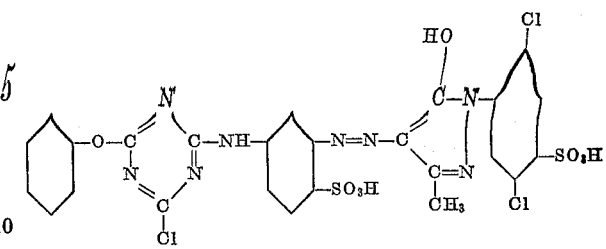

7. The monoazo dyestuff which in its free acid state corresponds to the formula

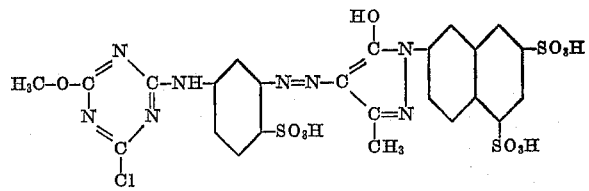

8. The monoazo dyestuff which in its free acid state corresponds to the formula

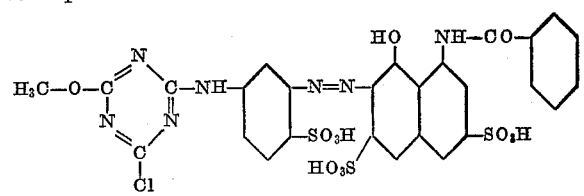

9. The monoazo dyestuff which in its free acid state corresponds to the formula

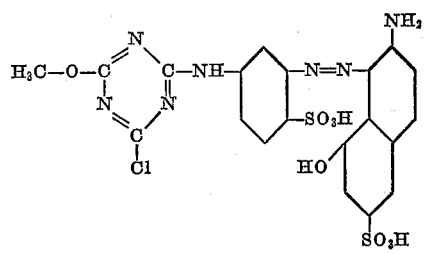

10. The monoazo dyestuff which in its free acid state corresponds to the formula

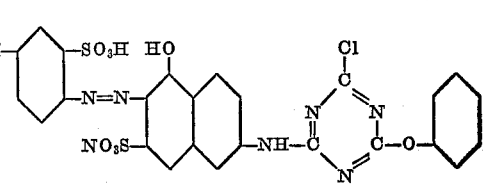

References Cited in the file of this patent
UNITED STATES PATENTS
2,795,576   Fasciati _____ June 11, 1957

UNITED STATES PATENT OFFICE
Certificate of Correction

Patent No. 2,891,941                                             June 23, 1959

Alfred Fasciati et al.

It is hereby certified that error appears in the printed specification of the above numbered patent requiring correction and that the said Letters Patent should read as corrected below.

Column 1, line 47, for "and" read —a—; column 2, line 50, for "1-acetocetylamino-" read —1-acetoacetylamino- —; line 51, for "acetacetylamino" read —acetoacetylamino—; column 5, line 57, for "1:4-diamino-benzene-1:" read —1:4-diamino-benzene,1:—; column 6, line 52, for "Thec ondensations are advataneogusly" read —The condensations are advantageously—; columns 7 and 8, in the table, second column, under the heading "I", opposite "2___", the right-hand portion of the formula should appear as shown below instead of as in the patent:

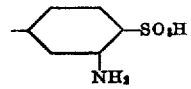

columns 9 and 10, in the table, second column, under the heading "I" opposite "7___" for that portion of the formula reading "H$_2$CO—" read —H$_3$CO— —; column 14, approximately line 53, for that portion of the formula reading "NO$_3$S—" read — HO$_3$S— —.

Signed and sealed this 22nd day of December 1959.

[SEAL]

Attest:
KARL H. AXLINE,
*Attesting Officer.*

ROBERT C. WATSON,
*Commissioner of Patents.*